United States Patent
Silvernail et al.

(10) Patent No.: US 8,802,617 B2
(45) Date of Patent: Aug. 12, 2014

(54) POLYGLYCEROL GRAFT POLYMERS WITH LOW CONCENTRATIONS OF CARBOXYLIC ACID CONTAINING MONOMERS AND THEIR APPLICATIONS

(71) Applicant: Ecolab USA Inc., St. Paul, MN (US)

(72) Inventors: Carter Silvernail, Burnsville, MN (US); John Nording, Hutchinson, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 13/672,462

(22) Filed: Nov. 8, 2012

(65) Prior Publication Data

US 2014/0128310 A1    May 8, 2014

(51) Int. Cl.
*C11D 1/00* (2006.01)
*C11D 7/06* (2006.01)

(52) U.S. Cl.
USPC ........... 510/476; 510/223; 510/229; 510/230; 510/434; 510/435; 510/475; 510/477; 510/478; 134/25.2; 134/25.3; 134/39; 134/42; 8/137

(58) Field of Classification Search
USPC ......... 510/223, 229, 230, 434, 435, 475, 476, 510/477, 478; 134/25.2, 25.3, 39, 42; 8/137
See application file for complete search history.

(56) References Cited

U.S. PATENT DOCUMENTS

| | | |
|---|---|---|
| 3,048,548 A | 8/1962 | Martin et al. |
| 3,334,147 A | 8/1967 | Brunelle et al. |
| 3,442,242 A | 5/1969 | Laskey et al. |
| 4,618,914 A | 10/1986 | Sato et al. |
| 4,782,901 A | 11/1988 | Phelps et al. |
| 4,830,773 A | 5/1989 | Olson |
| 5,760,154 A | 6/1998 | Krause et al. |
| 2008/0020948 A1* | 1/2008 | Rodrigues et al. ............ 507/111 |
| 2008/0020961 A1* | 1/2008 | Rodrigues et al. ............ 510/475 |

* cited by examiner

*Primary Examiner* — Brian P Mruk
(74) *Attorney, Agent, or Firm* — Amy J. Hoffman

(57) ABSTRACT

The present invention includes a cleaning composition that includes at least one alkalinity source, at least one surfactant, water and at least one polyglycerol graft polymer. The polyglycerol graft polymer includes a polyglycerol and a residue of at least one carboxylic acid or carboxylate containing compound in an amount less than or equal to about 40% by weight of the polyglycerol graft polymer.

11 Claims, No Drawings

POLYGLYCEROL GRAFT POLYMERS WITH LOW CONCENTRATIONS OF CARBOXYLIC ACID CONTAINING MONOMERS AND THEIR APPLICATIONS

TECHNICAL FIELD

The present invention is related to the field of hard water scale control, mineral dispersants, threshold inhibitors and/or soil antiredeposition agents. More particularly, the present invention is related to polyglycerol graft polymers containing a polyglycerol and residue of at least one carboxylic acid or carboxylate containing compound, and compositions containing such polyglycerol graft polymers.

BACKGROUND

Conventional detergents used in food and beverage (e.g., the dairy, cheese, sugar, meat, food, and brewery and other beverage industries), warewashing and laundry industries include alkaline detergents. Alkaline detergents, particularly those intended for institutional and commercial use, generally contain phosphates, nitrilotriacetic acid (NTA) and ethylenediaminetetraacetic acid (EDTA). Phosphates, NTA and EDTA are components commonly used in detergents to remove soils and to sequester metal ions such as calcium, magnesium and iron.

In particular, NTA, EDTA or polyphosphates such as sodium tripolyphosphate and their salts are used in detergents because of their ability to solubilize preexisting inorganic salts and/or soils. When calcium, magnesium and iron salts precipitate, the crystals may attach to the surface being cleaned and cause undesirable effects. For example, calcium carbonate precipitation on the surface of ware can negatively impact the aesthetic appearance of the ware, giving an unclean look. In the laundering area, if calcium carbonate precipitates and attaches onto the surface of fabric, the crystals may leave the fabric feeling hard and rough to the touch. In the food and beverage industry, the calcium carbonate residue can affect the acidity levels of foods. The ability of NTA, EDTA and polyphosphates to remove metal ions facilitates the detergency of the solution by preventing hardness precipitation, assisting in soil removal and/or preventing soil redeposition into the wash solution or wash water.

While effective, phosphates and NTA are subject to government regulations due to environmental and health concerns. Although EDTA is not currently regulated, it is believed that government regulations may be implemented due to environmental persistence. Therefore, there is a need in the art for an alternative, and preferably environment friendly, cleaning composition that can replace the properties of phosphorous-containing compounds such as phosphates, phosphonates, phosphites, and acrylic phosphinate polymers, as well as non-biodegradable aminocarboxylates such as NTA and EDTA.

SUMMARY

The present invention includes a cleaning composition comprising at least one alkalinity source, at least one surfactant, water and at least one polyglycerol graft polymer. The polyglycerol graft polymer includes a polyglycerol and a residue of at least one carboxylic acid or carboxylate containing compound in an amount less than or equal to about 40% by weight of the polyglycerol graft polymer. In one embodiment, polyglycerol graft polymer contains only the polyglycerol and the residue of at least one carboxylic acid or carboxylate containing compound.

A method of using a composition by mixing a detergent composition with water to form a use solution is also provided. The use solution may be brought into contact with a substrate to remove soil and/or prevent hard water scale accumulation, particularly on plastic, metal, ceramic, and glass substrates.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

The present application is directed to polyglycerol graft polymers containing a polyglycerol and residue of at least one carboxylic acid or carboxylate containing compound grafted onto the polyglycerol. The polyglycerol graft polymers may be useful in preventing hard water scale accumulation, and as mineral dispersants, threshold inhibitors, and soil antiredeposition agents. The graft polymers can comprise low levels of carboxylic acid or carboxylate residues and elevated amounts of bio-based content, which significantly reduces reliance on petroleum and/or natural gas feedstocks.

The present polyglycerol graft polymers can be used in any environment in which it is desirable to control hard water scale on surfaces such as but not limited to plastic, glass, ceramic and metal. The polyglycerol graft polymers may be used for consumer and industrial cleaning compositions such as warewashing, laundering, institutional, health care, food and beverage, and water treatment applications. More particularly, example applications include, but are not limited to: machine and manual warewashing, presoaks, laundry and textile cleaning and destaining, carpet cleaning and destaining, surface cleaning and destaining, kitchen and bath cleaning and destaining, floor cleaning and destaining, cleaning in place operations, general purpose cleaning and destaining, industrial or household cleaners, and industrial or municipal water systems. Compositions including such polyglycerol graft polymers and methods of using such polyglycerol graft polymers are also provided.

The polyglycerol graft polymers generally include a polyglycerol and residue of at least one carboxylic acid or carboxylate compound. More specifically, the polyglycerol graft polymers can include residue of at least one carboxylic acid or carboxylate compound attached or grafted to the polyglycerol.

The polyglycerol can be linear or branched. Suitable polyglycerols can have a molecular weight between about 100 and 20,000. Additionally, suitable polyglycerols can have a molecular weight between about 100 and 10,000 or between about 100 and 1,000. Suitable commercially available polyglycerols include Oxicure 500 and Oxicure 520, which are both available from Cargill. The polyglycerol graft polymer can include about 60% or greater by weight of the polyglycerol.

The polyglycerol graft polymers also contain a low concentration of at least one carboxylic acid or carboxylate containing residue, which can be grafted onto the polyglycerol. In one example, the residue of the carboxylic acid and/or carboxylate containing compound is grafted or attached to a polyglycerol backbone. The term residue refers to a carboxylic acid or carboxylate monomer or polymer chain once attached to the polyglycerol. The carboxylic acid or carboxylate residue may also be generated from a hydrolyzable ester functional group. For example, a methacrylic acid residue may be generated by hydrolysis of methyl methacrylate. The carboxylic acid or carboxylate residue may be generated from a hydrolyzable monomer prior to or during the point of use.

Example carboxylic acids and carboxylate compounds include but are not limited to maleic, itaconic, methacrylic, and acrylic acid and salts thereof. The residue may be of a single carboxylic acid or carboxylate containing compound. Alternatively, the residue may be of two or more different carboxylic acid or carboxylate containing compounds. For example, the polyglycerol graft polymer can include residue of acrylic and maleic acids or salts. The residue of at least one carboxylic acid or carboxylate containing compound can comprise less than half of the weight of the polyglycerol graft polymers. In one example, the polyglycerol graft polymers comprise less than or equal to about 40% by weight of the residue of the at least one carboxylic acid or carboxylate containing compound. In another example, the polyglycerol graft polymers comprise between about 5% and about 40% by weight of the residue of the at least one carboxylic acid or carboxylate containing compound. In a further example, the polyglycerol graft polymers comprise between about 10% and about 35% by weight of the residue of the at least one carboxylic acid or carboxylate containing compound.

In one embodiment, the polyglycerol graft polymer consists essentially of glycerol and the residue of at least one carboxylic acid or carboxylate containing compound. In such embodiments, glycerol may comprise 60% or more by weight of the polyglycerol graft polymer and the residue of at least one carboxylic acid or carboxylate containing compound may comprise 40% or less by weight of the polyglycerol graft polymer. The polyglycerol graft polymers can optionally include residue of a sulfonated compound or monomer such that the polyglycerol graft polymer consists essentially of glycerol, the residue of at least one carboxylic acid or carboxylate containing compound, and the residue of a sulfonated compound. Suitable sulfonated compounds include but are not limited to 2-acrylamido-2-methylpropane sulfonic acid (AMPS), vinyl sulfonic acid, sulfonated styrene, (methyl)allyl sulfonic acid, 1-allyl-oxy-2-hydroxypropane sulfonic acid and alkali metal salts thereof. In one example, the residue of AMPS can be grafted onto the polyglycerol backbone along with residue of at least one carboxylic acid or carboxylate containing compound. The residue of the sulfonated compound comprises less than half of the total weight of the polyglycerol graft polymer. For example, the residue of the sulfonated compound can be present in an amount of less than about 20% by weight of the polyglycerol graft polymer. As discussed further below, it is not required that the polyglycerol graft polymer contain a sulfonated compound or monomer, and it has been found that polygycerol graft polymers not including a sulfonated compound or monomer can inhibit scale formation to the same or greater extent than polygycerol graft polymers including a sulfonated compound or monomer.

The polyglycerol graft polymers can be formed by mixing at least one carboxylic acid or carboxylate containing compound, polyglycerol and water in a reactor. The amount of carboxylic acid and/or carboxylate compound added depends on the desired level of residue carboxylic acid and/or carboxylate compound in the final polyglycerol graft polymer. In one example, the carboxylic acid(s) and/or carboxylate compound(s) residue can comprise less than or equal to about 40% by weight of the final polyglycerol graft polymer.

While mixing the at least one carboxylic acid, polyglycerol and water at room temperature, iron (II) sulfate and mercaptoethanol are added successively. A solution consisting of hydrogen peroxide in water is then added dropwise to the reactor over a period of about 10 minutes. Upon addition of the hydrogen peroxide, the temperature of the solution increases. The solution should be stirred without additional heating for about 1 hour prior to neutralization with sodium hydroxide. As discussed above, sulfonated compounds may also form part of the polyglycerol graft polymer. If residue of a sulfonated compound is also desired in the final polyglycerol graft polymer, a sulfonated compound is added to the reactor at the same time as the polyglycerol. The remaining procedure is the same.

The component weight percentages of the polyglycerol graft polymers given above and in the examples are based on the amounts of the respective ingredients as originally added to the polyglycerol graft polymer. When a carboxylic acid or a carboxylate compound is added, the carboxylic acid/carboxylate residue weight is expressed as the weight of the carboxylic acid and/or equivalent carboxylic acid prior to neutralization with sodium hydroxide. When the carboxylate residue is formed from a hydrolyzed ester, the carboxylate residue weight is expressed as the weight of the ester. When the polyglycerol graft polymer includes a sulfonated compound residue, the sulfonated compound residue weight is expressed as the weight of the sulfonic acid or the equivalent sulfonic acid prior to neutralization.

The current polyglycerol graft polymers comprise an increased amount of biobased components and/or may be biodegradable. Biobased components are components that are composed, in whole or in significant part, of biological products. The amount of biological components or derivatives is referred to as biobased content, which is the amount of biobased carbon in the material or product expressed as a percent of weight (mass) of the total organic carbon in the material or product. Biobased content can be determined using ASTM Method D6866, entitled *Standard Test Methods for Determining the Biobased Content of Natural Range Materials Using Radiocarbon and Isotope Ratio Mass Spectrometry Analysis*. More specifically, ASTM Method D6866 uses radiocarbon dating to measure the amount of new carbon present in a product as a percentage of the total organic carbon by comparing the ratio of Carbon 12 to Carbon 14. The water content of a product is not included as part of biobased content as it contains no carbon. An increased biobased content reduces the use of petroleum and/or natural gas derived materials. Suitable polyglycerol graft polymers may have a biobased content greater than 10%, greater than 30%, greater than 40%, or greater than 70%.

Biobased content is distinct from product biodegradability. Product biodegradability measures the ability of microorganisms present in the environment to breakdown the carbon components within a product within a reasonable amount of time in a specified environment.

The polyglycerol graft polymers can be used as mineral dispersants, threshold inhibitors, scale inhibitors, and soil antiredeposition agents in aqueous systems. A threshold agent or threshold inhibitor refers to a compound that inhibits crystallization of water hardness ions from solution, but that need not form a specific complex with the water hardness ion. Threshold inhibitors are capable of maintaining hardness ions in solution beyond the normal precipitation concentration.

In one example, the graft polymers are incorporated into a detergent composition, such as a liquid or solid detergent composition. The presence of low concentrations of residue carboxylic acid commonly leads to a significant reduction in performance of a detergent. However, it was surprising found that low levels of at least one carboxylic acid or carboxylate containing compound residue produces polyglycerol graft polymers having anti-sealant and dispersant effects similar to those of commercially available polymers derived from oil and/or natural gas feedstocks.

Suitable detergent compositions generally include at least one alkalinity source, water, at least one polyglycerol graft polymer, and optionally at least one surfactant. Example alkalinity sources include alkali metal hydroxides and alkali metal carbonates. Suitable alkalinity sources include but are not limited to: sodium hydroxide, potassium hydroxide, sodium carbonate, potassium carbonate, a mixture of alkali metal hydroxides, a mixture of alkali metal carbonates, and a mixture of alkali metal hydroxide and alkali metal carbonate. The alkali metal hydroxide may be added to the composition in any form known in the art, including as solid beads, dissolved in an aqueous solution, or a combination thereof.

The alkalinity source controls the pH of the resulting solution when water is added to the detergent composition to form a use solution. The pH of the use solution must be maintained in the alkaline range in order to provide sufficient detergency properties. In one embodiment, the pH of the use solution is between approximately 9 and approximately 13. Particularly, the pH of the use solution is between about 10 and about 12. If the pH of the use solution is too high, for example, above 13, the use solution may be too alkaline and attack or damage the surface to be cleaned.

The alkalinity source may also function as a hydratable salt to form a solid composition. The hydratable salt can be referred to as substantially anhydrous. By substantially anhydrous, it is meant that the component contains less than about 2% by weight water based upon the weight of the hydratable component. The amount of water can be less than about 1% by weight, and can be less than about 0.5% by weight. There is no requirement that the hydratable salt be completely anhydrous.

The detergent composition also includes water. When the detergent composition is a solid, the water may be water of hydration to hydrate the alkalinity source/hydratable salt. It should be understood that the reference to water includes both water of hydration and free water. The phrase "water of hydration" refers to water which is somehow attractively bound to a non-water molecule. An exemplary form of attraction includes hydrogen bonding. The water of hydration also functions to increase the viscosity of the mixture during processing and cooling to prevent separation of the components. The amount of water of hydration in the detergent composition will depend on the alkalinity source/hydratable salt. In addition to water of hydration, the detergent composition may also have free water which isn't attractively bound to a non-water molecule.

In one embodiment, the detergent composition may comprise, consist essentially of or consist of at least one alkalinity source, water and at least one polyglycerol graft polymer. In other embodiments, the detergent composition may further include a surfactant or surfactant system.

A variety of surfactants can be used in the detergent composition, including, but not limited to: anionic, nonionic, cationic, and zwitterionic surfactants. Surfactants are an optional component of the detergent composition and can be excluded from the concentrate. Exemplary surfactants that can be used are commercially available from a number of sources. For a discussion of surfactants, see Kirk-Othmer, Encyclopedia of Chemical Technology, Third Edition, volume 8, pages 900-912. When the detergent composition includes a surfactant as a cleaning agent, the cleaning agent is provided in an amount effective to provide a desired level of cleaning. The detergent composition, when provided as a concentrate, can include the surfactant cleaning agent in a range of about 0.05% to about 20% by weight, about 0.5% to about 15% by weight, about 1% to about 15% by weight, about 1.5% to about 10% by weight, and about 2% to about 8% by weight. Additional exemplary ranges of surfactant in a concentrate include about 0.5% to about 8% by weight, and about 1% to about 5% by weight.

Examples of anionic surfactants useful in the detergent composition include, but are not limited to: carboxylates such as alkylcarboxylates and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, and alkylether sulfates. Exemplary anionic surfactants include, but are not limited to: sodium alkylarylsulfonate, alpha-olefinsulfonate, and fatty alcohol sulfates.

Examples of nonionic surfactants useful in the detergent composition include, but are not limited to, those having a polyalkylene oxide polymer as a portion of the surfactant molecule. Such nonionic surfactants include, but are not limited to: chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated amines such as alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ether; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers. An example of a commercially available ethylene oxide/propylene oxide block copolymer includes, but is not limited to, PLURONIC®, available from BASF Corporation, Florham Park, N.J. An example of a commercially available silicone surfactant includes, but is not limited to, ABIL® B8852, available from Goldschmidt Chemical Corporation, Hopewell, Va. A particularly suitable surfactant is D500, an ethylene oxide/propylene oxide copolymer available from BASF Corporation, Florham Park, N.J.

Examples of cationic surfactants that can be used in the detergent composition include, but are not limited to: amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride. The cationic surfactant can be used to provide sanitizing properties.

Examples of zwitterionic surfactants that can be used in the detergent composition include, but are not limited to: betaines, imidazolines, and propionates.

When the detergent composition is intended to be used in an automatic dishwashing or warewashing machine, the surfactants selected, if any surfactant is used, can be those that provide an acceptable level of foaming when used inside a dishwashing or warewashing machine. Detergent compositions for use in automatic dishwashing or warewashing machines are generally considered to be low-foaming compositions. Low foaming surfactants that provide the desired level of detersive activity are advantageous in an environment such as a dishwashing machine where the presence of large amounts of foaming can be problematic. In addition to selecting low foaming surfactants, defoaming agents can also be utilized to reduce the generation of foam. Accordingly, surfactants that are considered low foaming surfactants can be used. In addition, other surfactants can be used in conjunction with a defoaming agent to control the level of foaming.

Example solid and liquid detergent compositions are presented in Tables 1 and 2 below.

TABLE 1

Example solid detergent compositions

| | Example Range 1 | Example Range 2 | Example Range 3 |
|---|---|---|---|
| Alkalinity source | 0.1-90 wt % | 1-75 wt % | 5-60 wt % |
| Water | 0.1-50 wt % | 1-35 wt % | 5-25 wt % |
| Surfactant | 0.1-15 wt % | 1-10 wt % | 1-5 wt % |
| Graft polymer | 0.1-30 wt % | 1-20 wt % | 1-10 wt % |

TABLE 2

Example liquid detergent compositions

| | Example Range 1 | Example Range 2 | Example Range 3 |
|---|---|---|---|
| Alkalinity source | 0.1-60 wt % | 1-45 wt % | 1-30 wt % |
| Water | 0.1-70 wt % | 1-45 wt % | 1-30 wt % |
| Surfactant | 0.1-15 wt % | 1-10 wt % | 1-5 wt % |
| Graft polymer | 0.1-30 wt % | 1-20 wt % | 1-10 wt % |

The detergent compositions of the present invention can be provided in any of a variety of embodiments of detergent compositions. In an embodiment, the detergent composition is substantially free of phosphorous, nitrilotriacetic acid (NTA) and ethylenediaminetetraacetic acid (EDTA). Phosphorus-free means a composition having less than approximately 0.5 wt %, more particularly, less than approximately 0.1 wt %, and even more particularly less than approximately 0.01 wt % phosphorous based on the total weight of the composition. NTA-free means a composition having less than approximately 0.5 wt %, less than approximately 0.1 wt %, and particularly less than approximately 0.01 wt % NTA based on the total weight of the composition. When the composition is NTA-free, it may also be compatible with chlorine, which functions as an anti-redeposition and stain-removal agent. When diluted to a use solution, the detergent composition includes phosphorous-containing components, NTA and EDTA concentrations of less than approximately 100 ppm, particularly less than approximately 10 ppm, and more particularly less than approximately 1 ppm.

Additional Functional Materials

The detergent compositions can also include various additional functional components. In some embodiments, the alkalinity source, water, and the polyglycerol graft polymer make up a large amount, or even substantially all of the total weight of the detergent composition, for example, in embodiments having few or no additional functional materials disposed therein.

In alternative embodiments, functional materials are added to provide desired properties and functionalities to the detergent composition. For the purpose of this application, the term "functional materials" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional materials may be used. Moreover, the components discussed above may be multi-functional and may also provide several of the functional benefits discussed below.

Secondary Alkali Source

The detergent composition can include one or more secondary alkali sources. Examples of suitable secondary alkali sources of the detergent composition include, but are not limited to alkali metal carbonates, alkali metal hydroxides and alkali metal silicates. Exemplary alkali metal carbonates that can be used include, but are not limited to: sodium or potassium carbonate, bicarbonate, sesquicarbonate, and mixtures thereof. Exemplary alkali metal hydroxides that can be used include, but are not limited to: lithium, sodium or potassium hydroxide. The alkali metal hydroxide may be added to the detergent composition in any form known in the art, including as solid beads, dissolved in an aqueous solution, or a combination thereof. Examples of alkali metal silicates include, but are not limited to lithium, sodium or potassium silicate or polysilicate, lithium, sodium or potassium metasilicate and hydrated sodium or potassium metasilicate or a combination thereof.

Builders or Water Conditioners

The detergent composition can include one or more building agents, also called chelating or sequestering agents (e.g., builders), including, but not limited to: condensed phosphates, alkali metal carbonates, phosphonates, aminocarboxylic acids, and/or polyacrylates. In general, a chelating agent is a molecule capable of coordinating (i.e., binding) the metal ions commonly found in natural water to prevent the metal ions from interfering with the action of the other detersive ingredients of a cleaning composition. Preferable levels of addition for builders that can also be chelating or sequestering agents are between about 0.1% to about 70% by weight, about 1% to about 60% by weight, or about 1.5% to about 50% by weight. If the solid detergent composition is provided as a concentrate, the concentrate can include between approximately 1% to approximately 60% by weight, between approximately 3% to approximately 50% by weight, and between approximately 6% to approximately 45% by weight of the builders. Additional ranges of the builders include between approximately 3% to approximately 20% by weight, between approximately 6% to approximately 15% by weight, between approximately 25% to approximately 50% by weight, and between approximately 35% to approximately 45% by weight.

Examples of condensed phosphates include, but are not limited to: sodium and potassium orthophosphate, sodium and potassium pyrophosphate, sodium tripolyphosphate, and sodium hexametaphosphate. A condensed phosphate may also assist, to a limited extent, in solidification of the detergent composition by fixing the free water present in the detergent composition as water of hydration.

Examples of phosphonates include, but are not limited to: 2-phosphonobutane-1,2,4-tricarboxylic acid (PBTC), 1-hydroxyethane-1,1-diphosphonic acid, $CH_2C(OH)[PO(OH)_2]_2$; aminotri(methylenephosphonic acid), $N[CH_2PO(OH)_2]_3$; aminotri(methylenephosphonate), sodium salt (ATMP), N[CH$_2$ PO(ONa)$_2$]$_3$; 2-hydroxyethyliminobis(methylenephosphonic acid), HOCH$_2$CH$_2$N[CH$_2$PO(OH)$_2$]$_2$; diethylenetriaminepenta(methylenephosphonic acid), (HO)$_2$POCH$_2$N[CH$_2$ CH$_2$N[CH$_2$ PO(OH)$_2$]$_2$]$_2$; diethylenetriaminepenta (methylenephosphonate), sodium salt (DTPMP), C$_9$H$_{(28-x)}$N$_3$ Na$_x$O$_{15}$P$_5$ (x=7); hexamethylenediamine(tetramethylenephosphonate), potassium salt, C$_{10}$H$_{(28-x)}$ N$_2$K$_x$ O$_{12}$P$_4$ (x=6); bis(hexamethylene)triamine(pentamethylenephosphonic acid), (HO$_2$)POCH$_2$N[(CH$_2$)$_2$N[CH$_2$ PO(OH)$_2$]$_2$]$_2$; and phosphorus acid, H$_3$PO$_3$. A preferred phosphonate combination is ATMP and DTPMP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the detergent composition is phosphorous-free.

Useful aminocarboxylic acid materials containing little or no NTA include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), methylglycinediacetic acid (MGDA), glutamic acid-N,N-diacetic acid (GLDA), ethylenediaminesuccinic acid (EDDS), 2-hydroxyethyliminodiacetic acid (HEIDA), iminodisuccinic acid (IDS), 3-hydroxy-2-2'-iminodisuccinic acid (HIDS) and other similar acids or salts thereof having an amino group with a carboxylic acid substituent. In one embodiment, however, the detergent composition is free of aminocarboxylates.

Water conditioning polymers can be used as non-phosphorus containing builders. Exemplary water conditioning polymers include, but are not limited to: polycarboxylates. Exemplary polycarboxylates that can be used as builders and/or water conditioning polymers include, but are not limited to: those having pendant carboxylate (—CO$_2^-$) groups such as polyacrylic acid, maleic acid, maleic/olefin polymer, sulfonated polymer or terpolymer, acrylic/maleic polymer, polymethacrylic acid, acrylic acid-methacrylic acid polymers, hydrolyzed polyacrylamide, hydrolyzed polymethacrylamide, hydrolyzed polyamide-methacrylamide polymers, hydrolyzed polyacrylonitrile, hydrolyzed polymethacrylonitrile, and hydrolyzed acrylonitrile-methacrylonitrile polymers. Other suitable water conditioning polymers include starch, sugar or polyols comprising carboxylic acid or ester functional groups. Exemplary carboxylic acids include but are not limited to maleic acid, acrylic, methacrylic and itaconic acid or salts thereof. Exemplary ester functional groups include aryl, cyclic, aromatic and C$_1$-C$_{10}$ linear, branched or substituted esters. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at substoichiometric levels to function as crystal modifiers Hardening Agents The detergent compositions can also include a hardening agent in addition to, or in the form of, the builder. A hardening agent is a compound or system of compounds, organic or inorganic, which significantly contributes to the uniform solidification of the detergent composition. Preferably, the hardening agents are compatible with the cleaning agent and other active ingredients of the detergent composition and are capable of providing an effective amount of hardness and/or aqueous solubility to the processed detergent composition. The hardening agents should also be capable of forming a homogeneous matrix with the cleaning agent and other ingredients when mixed and solidified to provide a uniform dissolution of the cleaning agent from the detergent composition during use.

The amount of hardening agent included in the detergent composition will vary according to factors including, but not limited to: the type of detergent composition being prepared, the ingredients of the detergent composition, the intended use of the detergent composition, the quantity of dispensing solution applied to the solid detergent composition over time during use, the temperature of the dispensing solution, the hardness of the dispensing solution, the physical size of the detergent composition, the concentration of the other ingredients, and the concentration of the cleaning agent in the detergent composition. It is preferred that the amount of the hardening agent included in the detergent composition is effective to combine with the cleaning agent and other ingredients of the detergent composition to form a homogeneous mixture under continuous mixing conditions and a temperature at or below the melting temperature of the hardening agent.

It is also preferred that the hardening agent form a matrix with the cleaning agent and other ingredients which will harden to a solid form under ambient temperatures of approximately 30° C. to approximately 50° C., particularly approximately 35° C. to approximately 45° C., after mixing ceases and the mixture is dispensed from the mixing system, within approximately 1 minute to approximately 3 hours, particularly approximately 2 minutes to approximately 2 hours, and particularly approximately 5 minutes to approximately 1 hour. A minimal amount of heat from an external source may be applied to the mixture to facilitate processing of the mixture. It is preferred that the amount of the hardening agent included in the detergent composition is effective to provide a desired hardness and desired rate of controlled solubility of the processed composition when placed in an aqueous medium to achieve a desired rate of dispensing the cleaning agent from the solidified composition during use.

The hardening agent may be an organic or an inorganic hardening agent. A preferred organic hardening agent is a polyethylene glycol (PEG) compound. The solidification rate of compositions comprising a polyethylene glycol hardening agent will vary, at least in part, according to the amount and the molecular weight of the polyethylene glycol added to the detergent composition. Examples of suitable polyethylene glycols include, but are not limited to: solid polyethylene glycols of the general formula H(OCH$_2$CH$_2$)$_n$OH, where n is greater than 15, particularly approximately 30 to approximately 1700. Typically, the polyethylene glycol is a solid in the form of a free-flowing powder or flakes, having a molecular weight of approximately 1,000 to approximately 100,000, particularly having a molecular weight of at least approximately 1,450 to approximately 20,000, more particularly between approximately 1,450 to approximately 8,000. The polyethylene glycol is present at a concentration of from approximately 1% to 75% by weight and particularly approximately 3% to approximately 15% by weight. Suitable polyethylene glycol compounds include, but are not limited to: PEG 4000, PEG 1450, and PEG 8000 among others, with PEG 4000 and PEG 8000 being most preferred. An example of a commercially available solid polyethylene glycol includes, but is not limited to: CARBOWAX, available from Union Carbide Corporation, Houston, Tex.

Preferred inorganic hardening agents are hydratable inorganic salts, including, but not limited to: sulfates and bicarbonates. The inorganic hardening agents are present at concentrations of up to approximately 50% by weight, particularly approximately 5% to approximately 25% by weight, and more particularly approximately 5% to approximately 15% by weight. In one embodiment, however, the solid composition if free of sulfates and carbonates including soda ash.

Urea particles can also be employed as hardeners in the detergent compositions. The solidification rate of the compositions will vary, at least in part, to factors including, but not limited to: the amount, the particle size, and the shape of the urea added to the composition. For example, a particulate form of urea can be combined with a cleaning agent and other ingredients, and preferably a minor but effective amount of water. The amount and particle size of the urea is effective to combine with the cleaning agent and other ingredients to form a homogeneous mixture without the application of heat from an external source to melt the urea and other ingredients to a molten stage. It is preferred that the amount of urea included in the composition is effective to provide a desired hardness and desired rate of solubility of the composition when placed in an aqueous medium to achieve a desired rate of dispensing the cleaning agent from the solidified composition during use. In some embodiments, the composition includes between approximately 5% to approximately 90% by weight urea, particularly between approximately 8% and approximately 40% by weight urea, and more particularly between approximately 10% and approximately 30% by weight urea.

The urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is preferably milled to reduce the particle size to about 50 U.S. mesh to about 125 U.S. mesh, particularly about 75-100 U.S. mesh, preferably using a wet mill such as a single or twin-screw extruder, a Teledyne mixer, a Ross emulsifier, and the like.

Bleaching Agents

Bleaching agents suitable for use in the detergent composition for lightening or whitening a substrate include bleaching compounds capable of liberating an active halogen species, such as $Cl_2$, $Br_2$, $-OCl^-$ and/or $-OBr^-$, under conditions typically encountered during the cleansing process. Suitable bleaching agents for use in the detergent compositions include, but are not limited to: chlorine-containing compounds such as chlorine, hypochlorites, or chloramines. Exemplary halogen-releasing compounds include, but are not limited to: the alkali metal dichloroisocyanurates, chlorinated trisodium phosphate, the alkali metal hypochlorites, monochloramine, and dichloramine. Encapsulated chlorine sources may also be used to enhance the stability of the chlorine source in the composition (see, for example, U.S. Pat. Nos. 4,618,914 and 4,830,773, the disclosure of which is incorporated by reference herein). A bleaching agent may also be a peroxygen or active oxygen source such as hydrogen peroxide, perborates, sodium carbonate peroxyhydrate, potassium permonosulfate, and sodium perborate mono and tetrahydrate, with and without activators such as tetraacetylethylene diamine. When the concentrate includes a bleaching agent, it can be included in an amount between approximately 0.1% and approximately 60% by weight, between approximately 1% and approximately 20% by weight, between approximately 3% and approximately 8% by weight, and between approximately 3% and approximately 6% by weight.

Fillers

The detergent composition can include an effective amount of detergent fillers which do not perform as a cleaning agent per se, but cooperates with the cleaning agent to enhance the overall cleaning capacity of the detergent composition. Examples of detergent fillers suitable for use in the present detergent compositions include, but are not limited to: sodium sulfate and sodium chloride. When the concentrate includes a detergent filler, it can be included in an amount up to approximately 50% by weight, between approximately 1% and approximately 30% by weight, or between approximately 1.5% and approximately 25% by weight.

Defoaming Agents

A defoaming agent for reducing the stability of foam may also be included in the detergent composition. Examples of defoaming agents include, but are not limited to: ethylene oxide/propylene block polymers such as those available under the name Pluronic® N-3 available from BASF Corporation, Florham Park, N.J.; silicone compounds such as silica dispersed in polydimethylsiloxane, polydimethylsiloxane, and functionalized polydimethylsiloxane such as those available under the name Abil® B9952 available from Goldschmidt Chemical Corporation, Hopewell, Va.; fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated herein by reference. When the concentrate includes a defoaming agent, the defoaming agent can be provided in an amount between approximately 0.0001% and approximately 10% by weight, between approximately 0.001% and approximately 5% by weight, or between approximately 0.01% and approximately 1.0% by weight.

Anti-Redeposition Agents

The detergent composition can include an anti-redeposition agent for facilitating sustained suspension of soils in a cleaning solution and preventing the removed soils from being redeposited onto the substrate being cleaned. Examples of suitable anti-redeposition agents include, but are not limited to: polyacrylates, styrene maleic anhydride polymers, cellulosic derivatives such as hydroxyethyl cellulose, hydroxypropyl cellulose and carboxymethyl cellulose. When the concentrate includes an anti-redeposition agent, the anti-redeposition agent can be included in an amount between approximately 0.5% and approximately 10% by weight, and between approximately 1% and approximately 5% by weight.

Stabilizing Agents

The detergent composition may also include stabilizing agents. Examples of suitable stabilizing agents include, but are not limited to: borate, calcium/magnesium ions, propylene glycol, and mixtures thereof. The concentrate need not include a stabilizing agent, but when the concentrate includes a stabilizing agent, it can be included in an amount that provides the desired level of stability of the concentrate. Exemplary ranges of the stabilizing agent include up to approximately 20% by weight, between approximately 0.5% and approximately 15% by weight, and between approximately 2% and approximately 10% by weight.

Dispersants

The detergent composition may also include dispersants. Examples of suitable dispersants that can be used in the detergent composition include, but are not limited to: maleic acid/olefin polymers, polyacrylic acid, and mixtures thereof.

The concentrate need not include a dispersant, but when a dispersant is included it can be included in an amount that provides the desired dispersant properties. Exemplary ranges of the dispersant in the concentrate can be up to approximately 20% by weight, between approximately 0.5% and approximately 15% by weight, and between approximately 2% and approximately 9% by weight.

Enzymes

Enzymes that can be included in the detergent composition include those enzymes that aid in the removal of starch and/or protein stains. Exemplary types of enzymes include, but are not limited to: proteases, alpha-amylases, and mixtures thereof. Exemplary proteases that can be used include, but are not limited to: those derived from *Bacillus* licheniformix, *Bacillus lenus, Bacillus alcalophilus*, and *Bacillus amyloliquefacins*. Exemplary alpha-amylases include *Bacillus subtilis, Bacillus amyloliquefaceins* and *Bacillus licheniformis*. The concentrate need not include an enzyme, but when the concentrate includes an enzyme, it can be included in an amount that provides the desired enzymatic activity when the detergent composition is provided as a use composition. Exemplary ranges of the enzyme in the concentrate include up to approximately 15% by weight, between approximately 0.5% to approximately 10% by weight, and between approximately 1% to approximately 5% by weight.

Fragrances and Dyes

Various dyes, odorants including perfumes, and other aesthetic enhancing agents can also be included in the detergent composition. Suitable dyes that may be included to alter the appearance of the detergent composition, include, but are not limited to: Direct Blue 86, available from Mac Dye-Chem Industries, Ahmedabad, India; Fastusol Blue, available from Mobay Chemical Corporation, Pittsburgh, Pa.; Acid Orange 7, available from American Cyanamid Company, Wayne, N.J.; Basic Violet 10 and Sandolan Blue/Acid Blue 182, available from Sandoz, Princeton, N.J.; Acid Yellow 23, available from Chemos GmbH, Regenstauf, Germany; Acid Yellow 17, available from Sigma Chemical, St. Louis, Mo.; Sap Green and Metanil Yellow, available from Keyston Analine and Chemical, Chicago, Ill.; Acid Blue 9, available from Emerald Hilton Davis, LLC, Cincinnati, Ohio; Hisol Fast Red and Fluorescein, available from Capitol Color and Chemical Company, Newark, N.J.; and Acid Green 25, Ciba Specialty Chemicals Corporation, Greenboro, N.C.

Fragrances or perfumes that may be included in the detergent compositions include, but are not limited to: terpenoids such as citronellol, aldehydes such as amyl cinnamaldehyde, a jasmine such as C1S-jasmine or jasmal, and vanillin.

Thickeners

The detergent compositions can include a rheology modifier or a thickener. The rheology modifier may provide the following functions: increasing the viscosity of the detergent compositions; increasing the particle size of liquid use compositions when dispensed through a spray nozzle; providing the use compositions with vertical cling to surfaces; providing particle suspension within the use compositions; or reducing the evaporation rate of the use compositions.

The rheology modifier may provide a use composition that is pseudo plastic, in other words the use composition or material when left undisturbed (in a shear mode), retains a high viscosity. However, when sheared, the viscosity of the material is substantially but reversibly reduced. After the shear action is removed, the viscosity returns. These properties permit the application of the material through a spray head. When sprayed through a nozzle, the material undergoes shear as it is drawn up a feed tube into a spray head under the influence of pressure and is sheared by the action of a pump in a pump action sprayer. In either case, the viscosity can drop to a point such that substantial quantities of the material can be applied using the spray devices used to apply the material to a soiled surface. However, once the material comes to rest on a soiled surface, the materials can regain high viscosity to ensure that the material remains in place on the soil. Preferably, the material can be applied to a surface resulting in a substantial coating of the material that provides the cleaning components in sufficient concentration to result in lifting and removal of the hardened or baked-on soil. While in contact with the soil on vertical or inclined surfaces, the thickeners in conjunction with the other components of the cleaner minimize dripping, sagging, slumping or other movement of the material under the effects of gravity. The material should be formulated such that the viscosity of the material is adequate to maintain contact between substantial quantities of the film of the material with the soil for at least a minute, particularly five minutes or more.

Examples of suitable thickeners or rheology modifiers are polymeric thickeners including, but not limited to: polymers or natural polymers or gums derived from plant or animal sources. Such materials may be polysaccharides such as large polysaccharide molecules having substantial thickening capacity. Thickeners or rheology modifiers also include clays.

A substantially soluble polymeric thickener can be used to provide increased viscosity or increased conductivity to the use compositions. Examples of polymeric thickeners for the aqueous compositions of the invention include, but are not limited to: carboxylated vinyl polymers such as polyacrylic acids and sodium salts thereof, ethoxylated cellulose, polyacrylamide thickeners, cross-linked, xanthan compositions, sodium alginate and algin products, hydroxypropyl cellulose, hydroxyethyl cellulose, and other similar aqueous thickeners that have some substantial proportion of water solubility. Examples of suitable commercially available thickeners include, but are not limited to: Acusol, available from Rohm & Haas Company, Philadelphia, Pa.; and Carbopol, available from B.F. Goodrich, Charlotte, N.C.

Examples of suitable polymeric thickeners include, but not limited to: polysaccharides. An example of a suitable commercially available polysaccharide includes, but is not limited to, Diutan, available from Kelco Division of Merck, San Diego, Calif. Thickeners for use in the compositions further include polyvinyl alcohol thickeners, such as, fully hydrolyzed (greater than 98.5 mol acetate replaced with the —OH function).

An example of a particularly suitable polysaccharide includes, but is not limited to, xanthans. Such xanthan polymers are preferred due to their high water solubility, and great thickening power. Xanthan is an extracellular polysaccharide of *xanthomonas campestras*. Xanthan may be made by fermentation based on corn sugar or other corn sweetener byproducts. Xanthan comprises a poly beta-(1-4)-D-Glucopyranosyl backbone chain, similar to that found in cellulose. Aqueous dispersions of xanthan gum and its derivatives exhibit novel and remarkable rheological properties. Low concentrations of the gum have relatively high viscosities which permit it to be used economically. Xanthan gum solutions exhibit high pseudo plasticity, i.e. over a wide range of concentrations, rapid shear thinning occurs that is generally understood to be instantaneously reversible. Non-sheared materials have viscosities that appear to be independent of the pH and independent of temperature over wide ranges. Preferred xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which is herein incorporated by reference. Suitable crosslinking agents for xanthan materials include, but are not limited to: metal cations such as $Al+3$, $Fe+3$, $Sb+3$, $Zr+4$ and other transition metals. Examples of suitable commercially available xanthans include, but are not limited to KELTROL®, KELZAN® AR, KELZAN® D35, KELZAN® S, KELZAN® XZ, available from Kelco Division of Merck, San Diego, Calif. Known organic crosslinking agents can also be used. A preferred crosslinked xanthan is KELZAN® AR, which provides a pseudo plastic use composition that can produce large particle size mist or aerosol when sprayed.

Methods of Manufacture

In general, the detergent composition of the present invention can be created by combining the at least one alkalinity source, water, at least one polyglycerol graft polymer, optional surfactant(s) and any additional functional components and allowing the components to interact.

In one example, the at least one alkalinity source, water, at least one polyglycerol graft polymer, optional surfactant(s) and any additional functional components interact and harden into solid form. The solidification process may last from a few minutes to about six hours, depending on factors including, but not limited to: the size of the formed or cast composition, the ingredients of the composition, and the temperature of the composition.

The solid compositions may be formed using a batch or continuous mixing system. In an exemplary embodiment, a single- or twin-screw extruder is used to combine and mix one or more cleaning agents at high shear to form a homogeneous mixture. In some embodiments, the processing temperature is at or below the melting temperature of the components. The processed mixture may be dispensed from the mixer by forming, casting or other suitable means, whereupon the composition hardens to a solid form. The structure of the matrix may be characterized according to its hardness, melting point, material distribution, crystal structure, and other like properties according to known methods in the art. Generally, a solid composition processed according to the method of the invention is substantially homogeneous with regard to the distribution of ingredients throughout its mass and is dimensionally stable.

In an extrusion process, the liquid and solid components are introduced into final mixing system and are continuously mixed until the components form a substantially homogeneous semi-solid mixture in which the components are distributed throughout its mass. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

In a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

By the term "solid", it is meant that the hardened composition will not flow and will substantially retain its shape under moderate stress or pressure or mere gravity. The degree of hardness of the solid cast composition may range from that of a fused solid product which is relatively dense and hard, for example, like concrete, to a consistency characterized as being a hardened paste. In addition, the term "solid" refers to the state of the detergent composition under the expected conditions of storage and use of the solid composition. In general, it is expected that the detergent composition will remain in solid form when exposed to temperatures of up to approximately 100° F. and particularly up to approximately 120° F.

The resulting solid composition may take forms including, but not limited to: a cast solid product; an extruded, molded or formed solid pellet, block, tablet, powder, granule, flake; or the formed solid can thereafter be ground or formed into a powder, granule, or flake. In an exemplary embodiment, extruded pellet materials formed by the solidification matrix have a weight of between approximately 50 grams and approximately 250 grams, extruded solids formed by the composition have a weight of approximately 100 grams or greater, and solid block detergents formed by the composition have a mass of between approximately 1 and approximately 10 kilograms. The solid compositions provide for a stabilized source of functional materials. In some embodiments, the solid composition may be dissolved, for example, in an aqueous or other medium, to create a concentrated and/or use composition. The solution may be directed to a storage reservoir for later use and/or dilution, or may be applied directly to a point of use.

In certain embodiments, the solid composition is provided in the form of a unit dose. A unit dose refers to a solid composition unit sized so that the entire unit is used during a single washing cycle. When the solid composition is provided as a unit dose, it is typically provided as a cast solid, an extruded pellet, or a tablet having a size of between approximately 1 gram and approximately 50 grams.

In other embodiments, the solid composition is provided in the form of a multiple-use solid, such as a block or a plurality of pellets, and can be repeatedly used to generate aqueous compositions for multiple washing cycles. In certain embodiments, the solid composition is provided as a cast solid, an extruded block, or a tablet having a mass of between approximately 5 grams and approximately 10 kilograms. In certain embodiments, a multiple-use form of the solid composition has a mass between approximately 1 kilogram and approximately 10 kilograms. In further embodiments, a multiple-use form of the solid composition has a mass of between approximately 5 kilograms and about approximately 8 kilograms. In other embodiments, a multiple-use form of the solid composition has a mass of between about approximately 5 grams and approximately 1 kilogram, or between approximately 5 grams and approximately 500 grams.

Although the detergent composition is discussed as being formed into a solid product, the detergent composition may also be provided in the form of a paste or liquid. When the concentrate is provided in the form of a paste, enough water is added to the composition such that complete solidification of the composition is precluded. In addition, dispersants and other components may be incorporated into the composition in order to maintain a desired distribution of components.

Methods of Use

The detergent compositions can include concentrate compositions which may be added to an aqueous system or may be diluted to form use compositions. In general, a concentrate refers to a composition that is intended to be added to or diluted with water, and the composition that contacts articles to be washed can be referred to as the use composition or use solution.

A use composition may be prepared from the concentrate by diluting the concentrate with water at a dilution ratio that provides a use composition having desired detersive properties. The water that is used to dilute the concentrate to form the use composition can be referred to as water of dilution or a dilutent, and can vary from one location to another. The use composition can also include additional functional ingredients at a level suitable for cleaning, rinsing, or the like.

The typical dilution factor is between approximately 1 and approximately 10,000 but will depend on factors including water hardness, the amount of soil to be removed and the like. In one embodiment, the concentrate is diluted at a ratio of between about 1:10 and about 1:1000 concentrate to water. Particularly, the concentrate is diluted at a ratio of between about 1:100 and about 1:5000 concentrate to water. More particularly, the concentrate is diluted at a ratio of between about 1:250 and 1:2000 concentrate to water.

A suitable concentration range of the components includes between about 10 and about 1,000 parts-per-million (ppm) of at least one alkalinity source and between about 1 and 1,000 ppm of at least one polyglycerol graft polymer. A particularly suitable concentration range of the components includes between about 50 and about 750 ppm of at least one alkalinity source and between about 1 and 500 ppm of at least one polyglycerol graft polymer. Another particularly suitable concentration range of the components includes between about 1 and about 500 ppm of at least one alkalinity source and between about 1 and 300 ppm of at least one polyglycerol graft polymer. Optionally, at least one surfactant may be present in an amount between about 1 ppm and about 150 ppm, between about 1 ppm and about 75 ppm, or between about 5 ppm and about 50 ppm.

The detergent composition can contain an effective concentration of the alkali metal hydroxide so that use composition has a pH of at least about 9.

EXAMPLES

The present invention is more particularly described in the following examples that are intended as illustrations only, since numerous modifications and variations within the scope of the present invention will be apparent to those of skill in the art. Unless otherwise noted, all parts, percentages, and ratios reported in the following examples are on a weight bases, and all reagents used in the examples were obtained, or are available, from the chemical suppliers described below, or may be synthesized by conventional techniques.

Materials Used

Oxicure 520: a 300-400 g/mol polyglycerol available from Cargill

Oxicure 500: a 100-200 g/mol polyglycerol available from Cargill

Acusol 445N: an acrylic homopolymer having a molecular weight of 4,500 g/mol and available from Dow Chemical Acumer 2000: an acrylamidomethyl propane sulfonate (AMPS) copolymer having a molecular weight of 4,500 g/mol and available from Dow Chemical Acusol 448: an acrylic/maleic copolymer having a molecular weight of 3,500 g/mol and available from Dow Chemical D500: an EO/PO block, non-ionic surfactant available from BASF Preparation of Polyglycerol Graft Polymer #1

The following were placed in a 1 liter reactor equipped with a reflux condenser: 59.5 grams of acrylic acid, 46.8 grams of de-ionized water, and 97.4 grams of Oxicure 520. While stirring at room temperature, 63.4 milligrams of iron (II) sulfate heptahydrate in 10 grams of de-ionized water, 2.63 grams of mercaptoethanol, and 3 grams of hydrogen peroxide (50%) in 10 grams of water were added successively to the reactor over a period of about 10 minutes. The temperature of the solution rose to about 208° F. and the reaction was stirred for about one hour. The solution was then neutralized with 30 grams of sodium hydroxide, which resulted in an orange colored solution. The percent solids were determined by heating samples in a vacuum oven at 50° C. (−30 PSI) for 12 hours. There was approximately 250 grams of product having 49% solids. The polyglycerol graft polymer contained about 38% by weight residue of acrylic acid. The weight percent of acrylic acid residue was calculated by dividing the acrylic acid weight by the total weight of acrylic acid and polyglycerol ((59.5 g/156.9 g)×100%=38%).

Preparation of Polyglycerol Graft Polymer #2

The following were placed in a 1 liter reactor equipped with a reflux condenser: 46.3 grams of acrylic acid, 16.2 grams of 2-acrylamido-2-methylpropane sulfonic acid, 45 grams of de-ionized water, 11.6 grams of sodium hydroxide (50%) and 99 grams of Oxicure 520. While stirring at room temperature, 2.63 grams of mercaptoethanol, 63.4 milligrams of iron (II) sulfate heptahydrate in 9.4 grams of de-ionized water, and a solution consisting of 3.1 grams of hydrogen peroxide (50%) in 12.2 grams of water were added successively to the reactor over a period of about 10 minutes. The temperature of the solution rose to about 208° F. and the reaction was stirred for about one hour. The solution was then neutralized with 33 grams of sodium hydroxide, which resulted in a yellow colored solution. The percent solids were determined by heating samples in a vacuum oven at 50° C. (−30 PSI) for 12 hours. There was approximately 249 grams of product having 64% solids. The polyglycerol graft polymer contained about 29% by weight residue of acrylic acid. The polyglycerol graft polymer also included residue of a sulfonated compound (AMPS).

Preparation of Polyglycerol Graft Polymer #3

The following were placed in a 1 liter reactor equipped with a reflux condenser: 31.5 grams of acrylic acid, 1.7 grams of maleic acid, 52 grams of de-ionized water, and 98.5 grams of Oxicure 520. While stirring at room temperature, 2.52 grams of mercaptoethanol, 79.5 milligrams of iron (II) sulfate heptahydrate in 9.5 grams of de-ionized water, and a solution consisting of 3.27 grams of hydrogen peroxide (50%) in 11.9 grams of water were added successively to the reactor over a period of about 10 minutes. The temperature of the solution rose to about 160° F. and the reaction was stirred for about one hour. The solution was then neutralized with 30 grams of sodium hydroxide, which resulted in a yellow colored solution. The percent solids were determined by heating samples in a vacuum oven at 50° C. (−30 PSI) for 12 hours. There was approximately 234 grams of product having 63% solids. The polyglycerol graft polymer contained about 31% by weight residue of two different carboxylic acids (acrylic acid and maleic acid). More specifically, polyglycerol graft polymer

3 contained about 24% by weight acrylic acid residue and 1.3% by weight maleic acid residue.

Preparation of Polyglycerol Graft Polymer #4

The following were placed in a 1 liter reactor equipped with a reflux condenser: 16.1 grams of acrylic acid, 45 grams of de-ionized water, and 96.2 grams of Oxicure 500. While stirring at about 120° F., 2.35 grams of mercaptoethanol, 79.4 milligrams of iron (II) sulfate heptahydrate in 10.5 grams of de-ionized water, and a solution consisting of 2.49 grams of hydrogen peroxide (50%) in 17.47 grams of water were added successively to the reactor over a period of about 10 minutes. The temperature of the solution rose to about 160° F. After dropping to about 130° F., the solution was heated to 150° F. for 45 minutes. The solution was then cooled to ambient temperature and subsequently neutralized with 30 grams of sodium hydroxide, which resulted in a yellow colored solution. The percent solids were determined by heating samples in a vacuum oven at 50° C. (−30 PSI) for 12 hours. There was approximately 223 grams of product having 59% solids. The graft polymer contained about 14% by weight acrylic acid monomers.

Preparation of Comparative Polyglycerol Graft Polymer A

The following were placed in a 1 liter reactor equipped with a reflux condenser: 94.3 grams of acrylic acid, 46.8 grams of de-ionized water, and 62.8 grams of Oxicure 520. While stirring at room temperature, 2.63 grams of mercaptoethanol, 63.4 milligrams of iron(II) sulfate heptahydrate in 10.5 grams of de-ionized water, and 2.9 grams of hydrogen peroxide (50%) in 25 grams of de-ionized water were added successively over a period of 20 minutes. The temperature rose to 198° F. and the reaction was stirred for 1 hour without applying additional heat. The solution was neutralized with 34 grams of sodium hydroxide (50%) resulting in a viscous, yellow solution. There was approximately 234 grams of product having 67% solids. The graft polymer contained about 60% by weight acrylic acid monomers.

Cleaning Libby Glasses

Six 10 oz. Libby glasses were prepared for laboratory warewashing procedures by removing all film and foreign material from the glass surface. A three-gallon stainless steel pail was filled with distilled water and placed on a hot plate set on high. The pail was covered with aluminum foil and brought to boil.

While the water in the pail was brought to a boil, the Libby glasses were placed on a glass rack and loaded in a Hobart AM-15 warewash machine. The warewash machine had a washbath volume of 60 L, a rinse volume of 4.5 L, a wash time of 50 seconds and a rinse time of 9 seconds. The warewash machine was filled with hot soft water (130° F. minimum) and 20 grams of Lime-A-Way, the door was closed and the automatic cycle was run.

When the cycle was complete, the warewash machine was drained, refilled with hot soft water and 20 grams of Guardian Plus, and the automatic cycle was run. When the cycle was complete, the warewash machine was drained, refilled with hot soft water and 10 grams of sodium tripolyphosphate, and the automatic cycle was run again.

After completion of the automatic cycle with polyphosphate, the machine was drained and refilled with the boiling distilled water from the pail. The control panel was switched to a delime setting and the machine was allowed to run with the distilled water for three minutes. After three minutes, the glasses were removed and the tops of the glasses were mopped with a clean, dry towel. The glasses were allowed to dry in the glass rack. The rack may be elevated on one side to facilitate draining and drying.

100 Cycle Warewashing Test

To determine the ability of various detergent compositions to prevent or reduce scale accumulation, six Libby 10 oz. glass tumblers were prepared by removing all film and foreign material from the surfaces of the glasses as described above. A Hobart AM-14 warewash machine was then filled with an appropriate amount of water and the water was tested for hardness. After recording the hardness value, the tank heaters were turned on. On the day of the experiments, the water hardness was 17 grains (1 grain=17 parts-per-million). The warewash machine was turned on and wash/rinse cycles were run through the machine until a wash temperature of between about 150° F. and about 160° F. and a rinse temperature of between about 175° F. and about 190° F. were reached. The controller was then set to dispense an appropriate amount of detergent into the wash tank. The detergent was dispensed such that when the detergent was mixed with water during the cycle to form a use solution, the detergent concentration in the use solution is specified in Table 3. The solution in the wash tank was titrated to verify detergent concentration. The warewash machine had a washbath volume of 60 liters, a rinse volume of 4.5 liters, a washtime of 50 seconds, and a rinse time of 9 seconds.

The six clean glass tumblers were placed diagonally in a Raburn rack (see arrangement below) and the rack was placed inside the warewash machine. (G=glass tumbler).

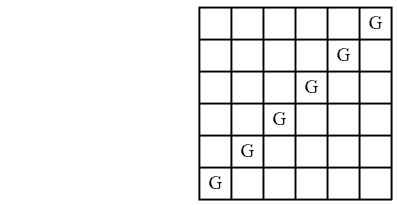

The 100 cycle test was then started. At the beginning of each wash cycle, the appropriate amount of detergent was automatically dispensed into the warewash machine to maintain the initial detergent concentration. The detergent concentration was controlled by conductivity.

Upon completion of 100 cycles, the rack was removed from the warewash machine and the glass and plastic tumblers were allowed to dry. The glass and plastic tumblers were then graded for spot and film accumulation using an analytical light box evaluation. The light box test used a digital camera, a light box, a light source, a light meter and a control computer employing "Spot Advance" and "Image Pro Plus" commercial software. A glass to be evaluated was placed on its side on the light box, and the intensity of the light source was adjusted to a predetermined value using the light meter. A photographic image of the glass was taken and saved to the computer. The software was then used to analyze the upper half of the glass, and the computer displayed a histogram graph with the area under the graph being proportional to the thickness of the film.

Generally, a lower light box score indicates that more light was able to pass through the tumbler. Thus, the lower the light box score, the more effective the composition was at preventing scale accumulation on the surface of the tumbler.

Samples 1-3 and Comparative Samples A-C

The ability of samples 1-3, which contained polyglycerol graft polymers 1-3, to minimize scale was compared to that of comparative samples A-C, which contained commercially available scale inhibitors Acusol 445N, Acumer 2000, and Acusol 448, respectively. The component weight concentrations of the detergent compositions of Samples 1-3 and comparative samples A-C are presented below in Table 3.

TABLE 3

|  | SMP 1 | SMP 2 | SMP 3 | Comp SMP A | Comp SMP B | Comp SMP C |
|---|---|---|---|---|---|---|
| Caustic | 66.89 | 66.89 | 66.89 | 66.89 | 66.89 | 66.89 |
| Water | 14.5 | 18.46 | 18.46 | 13 | 12.2 | 13.4 |
| D500 | 1.71 | 1.71 | 1.71 | 1.71 | 1.71 | 1.71 |
| Acusol 445N, 45% | 0 | 0 | 0 | 18.4 | 0 | 0 |
| Acumer 2000, 43% | 0 | 0 | 0 | 0 | 19.2 | 0 |
| Graft polymer 1, 49% | 16.9 | 0 | 0 | 0 | 0 | 0 |
| Graft polymer 2, 64% | 0 | 12.94 | 0 | 0 | 0 | 0 |
| Graft polymer 3, 63% | 0 | 0 | 12.94 | 0 | 0 | 0 |
| Acusol 448, 46% | 0 | 0 | 0 | 0 | 0 | 18 |
| Total | 100 | 100 | 100 | 100 | 100 | 100 |

Table 4 presents the light box score for each glass tumbler as well as the total glass tumbler light box score (SUM (glass)). Generally, a lower light box score indicates more effective scale accumulation prevention.

TABLE 4

|  | Glass#1 | Glass#2 | Glass#3 | Glass#4 | Glass#5 | Glass#6 | SUM (glass) |
|---|---|---|---|---|---|---|---|
| SMP 1 | 33542.2 | 46788.1 | 52442.19 | 48241.23 | 44221.76 | 30286.85 | 255522.33 |
| SMP 2 | 45822.12 | 45205.47 | 48419.77 | 50250.63 | 47138.82 | 41243.2 | 278080.01 |
| SMP 3 | 52893.09 | 54342.68 | 56656.83 | 55699.5 | 64300.15 | 51736.94 | 335629.19 |
| Comp SMP A | 51073.76 | 42606.06 | 43459.23 | 42041.11 | 38214.12 | 46055.27 | 263449.55 |
| Comp SMP B | 57355.7 | 63356.07 | 65329.14 | 63151.48 | 60535.38 | 50030.7 | 359758.47 |
| Comp SMP C | 40887.03 | 65174.79 | 65534.98 | 65534.93 | 58203.12 | 50946.68 | 346281.53 |

Comparative samples A, B and C were controls for samples 1, 2 and 3, respectively. In all cases, the polyglycerol graft polymer outperformed the commercially available polymer to which it was compared in the 100 cycle warewashing test. Additionally, Sample 1, which contained only polyglycerol and acrylic acid residues, was more effective at preventing scale compared to sample 2, which contained, polyglycerol, acrylic acid residue and sulfonated compound residue, and sample 3, which contained polyglycerol, acrylic acid residue and maleic acid residue.

Calcium Carbonate Dispersion Test

The calcium carbonate dispersion test is designed to measure the dispersing capability of a test substance, such as a polymer. First, a 500 ppm calcium carbonate slurry was formed with de-ionized water. The desired amount of test substance was added to the calcium carbonate slurry. After the mixture was stirred for 10 minutes, 50 mL of the suspension was poured into a 50 mL graduated cylinder and allowed to stand at ambient for 20 minutes. Approximately 5 grams of the calcium carbonate suspension was removed from the middle of the graduated cylinder and transferred into a pre-weighed container. The sample was removed by gently inserting the pipette such that the tip was at the 30 mL mark, and the percent transmittance of the sample at 560 nm was determined using a UV-VIS spectrometer with sample concentrations of 50 and 1,000 ppm. The percent dispersing efficiency (% DE) was calculated with equation 1, in which a higher number indicates higher dispersion.

$$\% \, DE = \frac{\left(\frac{\% \text{ transmittance of control} -}{\% \text{ transmittance of test sample}}\right)}{(\% \text{ transmittance of control})} \times 100\% \quad (1)$$

The calcium carbonate mixture was dosed with 50 ppm and 1,000 ppm test polymer as shown in Table 5. The percent transmittance and percent dispersing efficiency are also shown. The control was the calcium carbonate slurry without the addition of a test polymer.

TABLE 5

|  | % Transmittance | | % Dispersing Efficiency | |
|---|---|---|---|---|
| Test polymer | 50 ppm | 1000 ppm | 50 ppm | 1000 ppm |
| Control | 22.4 | 22.4 | 0 | 0 |
| Acusol 445N | 2.7 | 67.6 | 87.95 | −201.79 |
| Polyglycerol graft polymer 1 | 2.3 | 17.1 | 89.73 | 23.66 |
| Polyglycerol graft polymer 4 | 37.4 | 0.9 | −66.96 | 95.98 |
| Acusol 448 | 17.7 | 70 | 20.98 | −212.5 |
| Polyglycerol graft polymer 3 | 2.9 | 2.5 | 87.05 | 88.84 |
| Comparative polyglycerol graft polymer A | 80.7 | 99.5 | −165.18 | −334.20 |
| Polyglycerol | 31.6 | 18.9 | −41.07 | 15.63 |

The dispersing efficiency of Acusol 445N was compared to that of polyglycerol graft polymer 1 and polyglycerol graft polymer 4, and the dispersing efficiency of Acusol 448 was compared to that of polyglycerol graft polymer 3. At 50 ppm, polyglycerol graft polymers 1 and 3 had higher dispersing efficiencies than the respective commercially available polymer. At 1,000 ppm polyglycerol graft polymers 1, 3 and 4 had higher dispersing efficiencies than the respective commercially available polymers.

The dispersing efficiency of the test polymers were also compared to that of polyglycerol. As shown in Table 5, polyglycerol without residue of carboxylic acid or carboxylate compounds showed poor dispersing capabilities when compared to polyglycerol graft polymers 1 and 3 at 50 ppm and polyglycerol graft polymers 1, 3 and 4 at 1,000 ppm.

Further, the dispersing efficiency of the test polymers were compared to that of comparative polyglycerol graft polymer A, which included 60% by weight acrylic acid residue. Polyglycerol graft polymers 1, 3 and 4 each had a significantly higher dispersing efficiency than comparative polyglycerol graft polymer A.

Calcium Carbonate Inhibition Test

The calcium carbonate inhibition test is designed to test the ability of a compound to inhibit crystallization of water hardness ions from solution. A hardness solution was created by dissolving 33.45 grams $CaCl_2.2H_2O$ and 23.24 grams $MgCl_2.6H_2O$ in de-ionized water. The mixture was diluted to a volume of 1 liter. The hardness solution contained 2 grains of hardness for every 1 mL of hardness solution.

A 1.5 L beaker was filled with 1000 mL de-ionized water and a ½ inch stir bar was added. Sequentially while stirring, 50 mg of the test polymer, 780 mg of Na$_2$CO$_3$ and 8.5 mL of the hardness solution were added to the 1.5 mL beaker. The test solution was heated on a hot plate. A 5 mL aliquot was removed when the temperature reached 85° F., 140° F., 160° F. and 180° F., and the percent transmittance (% T) at 560 nm was determined by UV-VIS spectrophotometer. The percent inhibition was calculated by equation 2.

$$\% \text{ inhibition} = \frac{\% T \text{ of test sample at } 180 \text{ F.} - \% T \text{ of control at } 180 \text{ F.}}{\% T \text{ of blank at } 180 \text{ F.} - \% T \text{ of control at } 180 \text{ F.}} \times 100\% \quad (2)$$

The inhibition effects of Acusol 448, Acusol 445, polyglycerol, polyglycerol graft polymers 1, 3 and 4, and comparative polyglycerol graft polymer A were tested and the results are presented in Table 6. The control was the test solution without a test polymer. The blank was 100% water.

TABLE 6

| Polymer | % Transmittance | | | | % Inhibition |
|---|---|---|---|---|---|
| | 85 F. | 140 F. | 160 F. | 180 F. | (180 F.) |
| Control | 95.5 | 79.5 | 74.4 | 69.5 | 0 |
| Acusol 445N | 100 | 100 | 100 | 81.2 | 38.36 |
| Polyglycerol graft polymer 1 | 100 | 100 | 100 | 94.6 | 82.30 |
| Polyglycerol graft polymer 4 | 79.6 | 74.4 | 72.3 | 70.4 | 2.95 |
| Acusol 448 | 100 | 99.9 | 98.5 | 87.2 | 58.03 |
| Polyglycerol graft polymer 3 | 100 | 100 | 100 | 99.3 | 97.70 |
| Comparative polyglycerol graft polymer A | 99.9 | 100 | 100 | 79.6 | 33.11 |
| Polyglycerol | 99.8 | 83.4 | 76.4 | 73.1 | 11.80 |
| Blank | 100 | 100 | 100 | 100 | |

The polyglycerol graft polymers were compared to their commercially available counterparts. Acusol 445N was compared to polyglycerol graft polymer 1 and Acusol 448 was compared to polyglycerol graft polymer 3. Polyglycerol graft polymers 1 and 3 performed better than their respective commercially available counterparts as demonstrated by the higher percent inhabitation. Polyglycerol graft polymer 4, which contained 14% acrylic acid by weight, performed inferior to the control, Acusol 445N and polyglycerol.

The polyglycerol graft polymers were also compared to comparative polyglycerol graft polymer A. Polyglycerol graft polymer 1, which contained 38% carboxylic acid by weight, and polyglycerol graft polymer 3, which contained 31% carboxylic acid by weight, were significantly more effective at inhibiting calcium carbonate than comparative polyglycerol graft polymer A, which included 60% carboxylic acid by weight. Polyglycerol graft polymer 4, which included 14% carboxylic acid by weight, was less effective at inhibiting calcium carbonate than comparative polyglycerol graft polymer A.

Kaolin Clay Dispersion Test

The clay dispersion test is designed to measure the dispersing capability of a compound for clay particulate. A clay test mixture was formed by mixing Kaolin clay with synthetic 11 grain water (formed by the method described above for the hardness solution of the Calcium Carbonate Inhibition Test). The clay test mixture contained 2% Kaolin clay by weight.

The test polymer in an amount of 30 ppm was added to the clay test mixture and stirred for 10 minutes. After 10 minutes, the mixture was poured into a 50 mL graduated cylinder and was allowed to stand at ambient temperature for 30 minutes. Next, approximately 8 grams of the mixtures was removed from the middle of the graduated cylinder and transferred to a preweighed container. The sample was removed by gently inserting the pipette such that the tip was at the 30 mL mark. The sample was dried in an oven and the percent solids of the sample was calculated. A higher percent solids indicates better dispersion.

The Kaolin clay dispersion test results for polyglycerol graft polymer 1, polyglycerol graft polymer 2, comparative polyglycerol graft polymer A, Acumer 2000, Acusol 445, and a control are presented in Table 7. The control was the clay test mixture without a test substance.

TABLE 7

| Polymer | % solids |
|---|---|
| Control | 0.085 |
| Acusol 445N | 1.593 |
| Polyglycerol graft polymer 1 | 1.246 |
| Acumer 2000 | 1.672 |
| Polyglycerol graft polymer 2 | 1.597 |
| Comparative polyglycerol graft polymer A | 1.232 |

The polyglycerol graft polymers were compared to their commercially available counterparts. Acusol 445N and Acumer 2000 were compared to polyglycerol graft polymer 1 and polyglycerol graft polymer 2, respectively. Polyglycerol graft polymer 1 performed better than the control but slightly worse than Acusol 445. Polyglycerol graft polymer 2 performed better than the control and similar to Acumer 2000.

The polyglycerol graft polymers were also compared to comparative polyglycerol graft polymer A, which included 60% carboxylic acid by weight. Polyglycerol graft polymer 1 performed similar to comparative polyglycerol graft polymer A, and polyglycerol graft polymer 2 outperformed comparative polyglycerol graft polymer A.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A cleaning composition comprising:
   an alkalinity source consisting of an alkaline metal hydroxide;
   at least one surfactant
   water; and
   at least one polyglycerol graft polymer comprising:
      a polyglycerol;
      a residue of at least one carboxylic acid or carboxylate containing compound in an amount less than or equal to about 40% by weight of the polyglycerol graft polymer; and
   wherein the composition is a solid, the ratio of alkalinity source to water is at least 1:1 or greater and the composition is substantially free of phosphorous.

2. The cleaning composition of claim 1, wherein the carboxylic acid is selected from the group consisting of maleic acid, itaconic acid, methacrylic acid, and acrylic acid.

3. The cleaning composition of claim 1, wherein the residue of at least one carboxylic acid or carboxylate containing compound comprises residue of maleic acid or salts thereof.

4. The cleaning composition of claim 1, wherein the residue of at least one carboxylic acid or carboxylate containing compound includes a hydrolyzed ester functional group.

5. The cleaning composition of claim 1, wherein the at least one polyglycerol graft polymer consists essentially of the polyglycerol and the residue of at least one carboxylic acid or carboxylate containing compound.

6. The cleaning composition of claim 1, wherein the polyglycerol graft polymer further comprises residue of at least one sulfonated compound.

7. The cleaning composition of claim 6, wherein the sulfonated compound is selected from the group consisting of: 2-acrylamido-2-methylpropane sulfonic acid (AMPS), vinyl sulfonic acid, sulfonated styrene, (methyl)allyl sulfonic acid, 1-allyl-oxy-2-hydroxypropane sulfonic acid and alkali metal salts thereof.

8. The cleaning composition of claim 1, wherein the polyglycerol graft polymer has a bio-based content of greater than or equal to about 30%.

9. The cleaning composition of claim 1, wherein the cleaning composition consists essentially of:
at least one alkalinity source;
at least one surfactant;
water; and
at least one polyglycerol graft polymer consisting of the polyglycerol and the residue of at least one carboxylic acid or carboxylate containing compound.

10. A cleaning composition of claim 1, wherein the alkalinity source is present in an amount of between about 66 and about 90% by weight of the cleaning composition, the least one surfactant is present in an amount of between about 0.1% and about 15% by weight of the cleaning composition, the water is present an amount of between about 0.1% and about 50% by weight of the cleaning composition and the at least one polyglycerol graft polymer is present in an amount of between about 0.1% and about 30% by weight of the cleaning composition.

11. The cleaning composition of claim 10, and further comprising a residue of at least one sulfonated compound in an amount less than or equal to about 20% by weight of the polyglycerol graft polymer.

* * * * *